Figure 1:
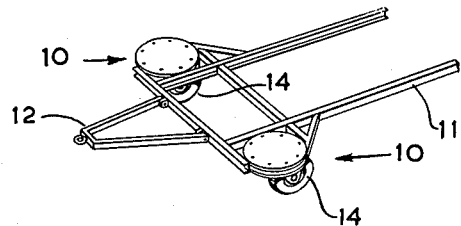

April 19, 1966  G. L. MARVIN  3,246,908
WHEEL MOUNTING MEANS FOR WAGONS
Filed Dec. 23, 1963

INVENTOR
GREGORY L. MARVIN
BY~ Fetherstonhaugh & Co.
ATTORNEYS

United States Patent Office 3,246,908
Patented Apr. 19, 1966

3,246,908
WHEEL MOUNTING MEANS FOR WAGONS
Gregory L. Marvin, R.R. 3, Newmarket,
Ontario, Canada
Filed Dec. 23, 1963, Ser. No. 332,380
3 Claims. (Cl. 280—29)

This invention relates to the manufacture of wagons and trailers, and is particularly concerned with means for mounting the front wheels on such vehicles in such a manner that backing of the vehicle is facilitated.

The wheel mounting means in accord with this invention is particularly adapted to use on farm wagons, but can be used on any type of wagon or trailer which frequently must be backed up, and in the normal course, would readily jackknife.

While it has previously been recognized that the backing of such vehicles can be facilitated by mounting the front wheels as castors, the wheel mounting means in accord with this invention, while obtaining the benefits of the castor type mounting, avoids the disadvantages thereof. The chief disadvantage of the prior wheel mounting arrangements is that the vehicles are given a dangerously high center of gravity, due to the castor mounting essentially consisting of a fork having a vertical pivot pin extending upwardly therefrom and received in a socket in the vehicle chassis.

It is the primary object of the invention, therefore, to provide a wheel mounting means for vehicles which will facilitate backing of the vehicles.

It is a more specific object of the invention to provide a wheel mounting means for mounting the front wheels of vehicles in a castor fashion, while maintaining the center of gravity of the vehicle low enough to give the vehicle stability.

These and other objects of the invention will be more thoroughly understood from the following description of a preferred embodiment thereof as read in conjunction with the accompanying drawings.

Figure 2:
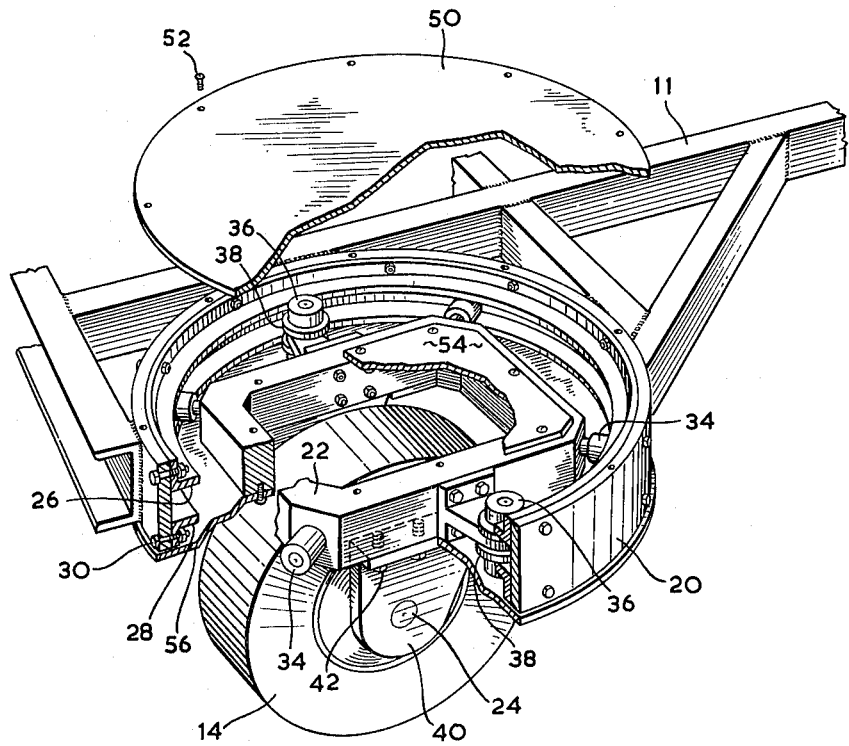

In the drawings:

FIGURE 1 is a perspective view of the forward part of a wagon chassis provided with wheels mounted in accord with the invention, and FIGURE 2 is a perspective view partly broken away of a wheel mounting means in accord with the invention.

FIGURE 1 shows the wheel mounting means 10 in accord with the invention fixed to a wagon chassis 11, which may be provided with the usual type of tongue device 12, by which the wagon is towed. As can be seen in FIGURE 1, the wagon chassis is mounted low over the wheels 14, and with the resultant low center of gravity of the wagon, it is relatively stable, as compared with prior wagons provided with castored wheels.

Referring now to FIGURE 2, the wheel mounting means in accord with the invention essentially consists of a circular bearing member 20, a frame member 22, which straddles the upper portion of the illustrated wheel 14, and which is connected to the axle 24 of wheel 14.

The circular bearing member 20 is preferably made of steel, and can be attached to the chassis 11 as by welding or the like. It carries on its inside surface a pair of flanges 26 and 28. These might be fixed to member 20 by bolts 30 or they might be permanently fixed to member 20 by welding. It is preferable, however, that the flanges be capable of replacement as it is possible they may become worn after long usage.

Frame 22 carries a plurality of load bearing rollers 34, which might consist of simple tubular bearings carried on axles protruding outwardly of frame 22. The spacing between flanges 26 and 28 is selected to roughly correspond to the diameter of rollers 34 as to avoid excessive vertical play of the rollers between the flanges. In order to maintain the central positioning of frame 22 within bearing member 20, the frame 22 also carries a pair of guide rollers 36. These might consist of simple rollers on vertical axles, and bearing against the inside surface of bearing member 20 between flanges 26 and 28, but preferably consist of rollers of the type illustrated and bearing against the radially inward edges of flanges 26 and 28. The illustrated rollers 36 carry shoulders 38, which bear against the top surface and the bottom surface of flanges 28 and 26 respectively, as to provide further means for preventing vertical play of the frame 22 between flanges 26 and 28.

Frame 22 is actually fixed to axle 24 through two downwardly depending arms 40, which can be fixed to the underside of frame 22 through bolts or the like 42. Arms 40 are connected to axle 24 in such a manner that a vertical plane extending upwardly through the longitudinal axis of axle 24, is displaced from the vertical axis of bearing member 20. This is an important feature as it insures that arms 40 act in the manner of trailing arms, thereby guaranteeing that the wheels will automatically orient themselves as to follow or trail the motivating force which moves the vehicle, which in the normal course, would consist of a pulling or pushing force on the tongue 12. It is to be noted that in FIGURE 2, wheel 14 is oriented with respect to chassis 11 as it would be oriented with the vehicle moving backwards. In FIGURE 1, wheels 14 are shown as being oriented as they would be with the vehicle moving forward.

As previously mentioned, it is an important object of the wheel mounting means in accord with this invention to mount the chassis relatively low over wheels 14, as to give the vehicle a low center of gravity. It will be appreciated that this low mounting is achieved through the use of the circular bearing member 20, as combined with the frame 22 straddling the upper portion of the wheel. In this regard, it will be noted that the center of frame 22 which corresponds with the center of bearing member 20, is displaced from the vertical plane extending upwardly through the longitudinal axis of axle 24, so as to achieve the desired "trailing" action of the wheels.

The illustrated wheel mounting means is provided with a number of shielding devices to prevent clogging of the rollers 34 and 36 by mud and the like. These are particularly important where the wheel mounting means is employed on farm wagons. These shields consist of a top plate 50 fixed to the top of bearing member 20 as by screws or the like 52, an inner top plate 54 fixed to the top surface of frame 22, and a lower plate 56 fixed to the underside of frame 22. This latter plate 56 is preferably spaced quite closely to the undersurface of bearing member 20, but it will be appreciated that plate 56 rotates with frame 22. The illustrated shields or plates 50, 54 and 56 adequately protect rollers 34 and 36 as material thrown upwardly by wheel 14 is prevented from entering the space in which the rollers operate by plates 54 and 56, while material falling downwardly from the vehicle is prevented from entering this space by the top plate 50.

What I claim as my invention is:

1. In a vehicle having castored front wheels as to facilitate backing of the vehicle, means for mounting said wheels on the chassis of said vehicle, each of said wheel mounting means comprising a circular bearing member fixed to the vehicle chassis, a frame member straddling the upper portion of said wheel and connected to opposite ends of an axle carried by said wheel, a first flange extending around the inside surface of said circular bearing member, a plurality of load bearing rollers fixed to said frame and bearing against the underside of said first flange, a second flange fixed to the inside surface of said circular bearing member, said second flange being vertically spaced from said first flange so that said load bearing rollers run between said flanges, a plurality of guide rollers also carried by said frame and bearing against the radially inward edges of said flanges, to maintain said frame centrally of said circular bearing member, said guide rollers having a pair of vertically spaced shoulders bearing against the underside of the top flange and against the top surface of the lowermost flange as to prevent excessive vertical play of said load bearing rollers between said flanges.

2. Wheel mounting means as claimed in claim 1, in which said frame is connected to the axle of said wheel through a pair of downwardly extending arm members, said frame being positioned relative to said wheel in such a manner that a vertical plane extending upwardly through the longitudinal axis of said wheel axle is displaced from the center of said frame, the center of said frame coinciding with the center of said circular bearing member.

3. Wheel mounting means as claimed in claim 2, including a first shield member fixed to the top of said circular bearing member, a second shield member fixed to the top of said frame and a third shield member fixed to the underside of said frame and extending outwardly therefrom, as to cover the space between the underside of said frame and the underside of said bearing member.

References Cited by the Examiner
UNITED STATES PATENTS

| | | | |
|---|---|---|---|
| 1,198,879 | 9/1916 | Valentine | 180—13 |
| 1,672,035 | 6/1928 | Nutting | 280—29 |
| 1,711,723 | 5/1929 | Cousins | 16—22 |
| 3,047,904 | 8/1962 | McDonald | 16—23 |

BENJAMIN HERSH, *Primary Examiner.*

A. HARRY LEVY, *Examiner.*